May 10, 1960     R. E. KITTREDGE     2,935,795
SIMULATED AIRCRAFT INCLINOMETER INSTRUMENT
Filed July 15, 1955     2 Sheets-Sheet 1
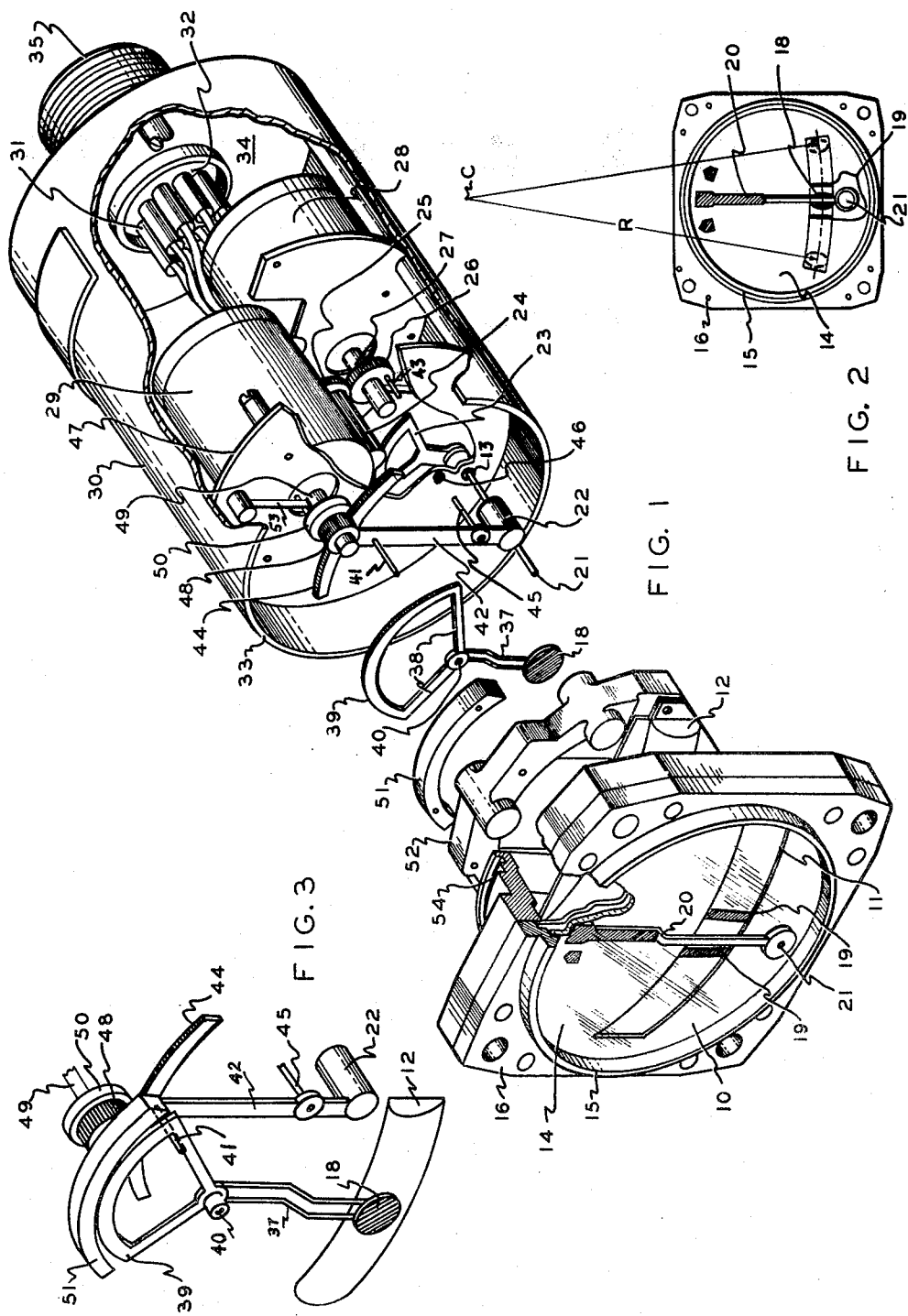

May 10, 1960
R. E. KITTREDGE
2,935,795
SIMULATED AIRCRAFT INCLINOMETER INSTRUMENT
Filed July 15, 1955
2 Sheets-Sheet 2
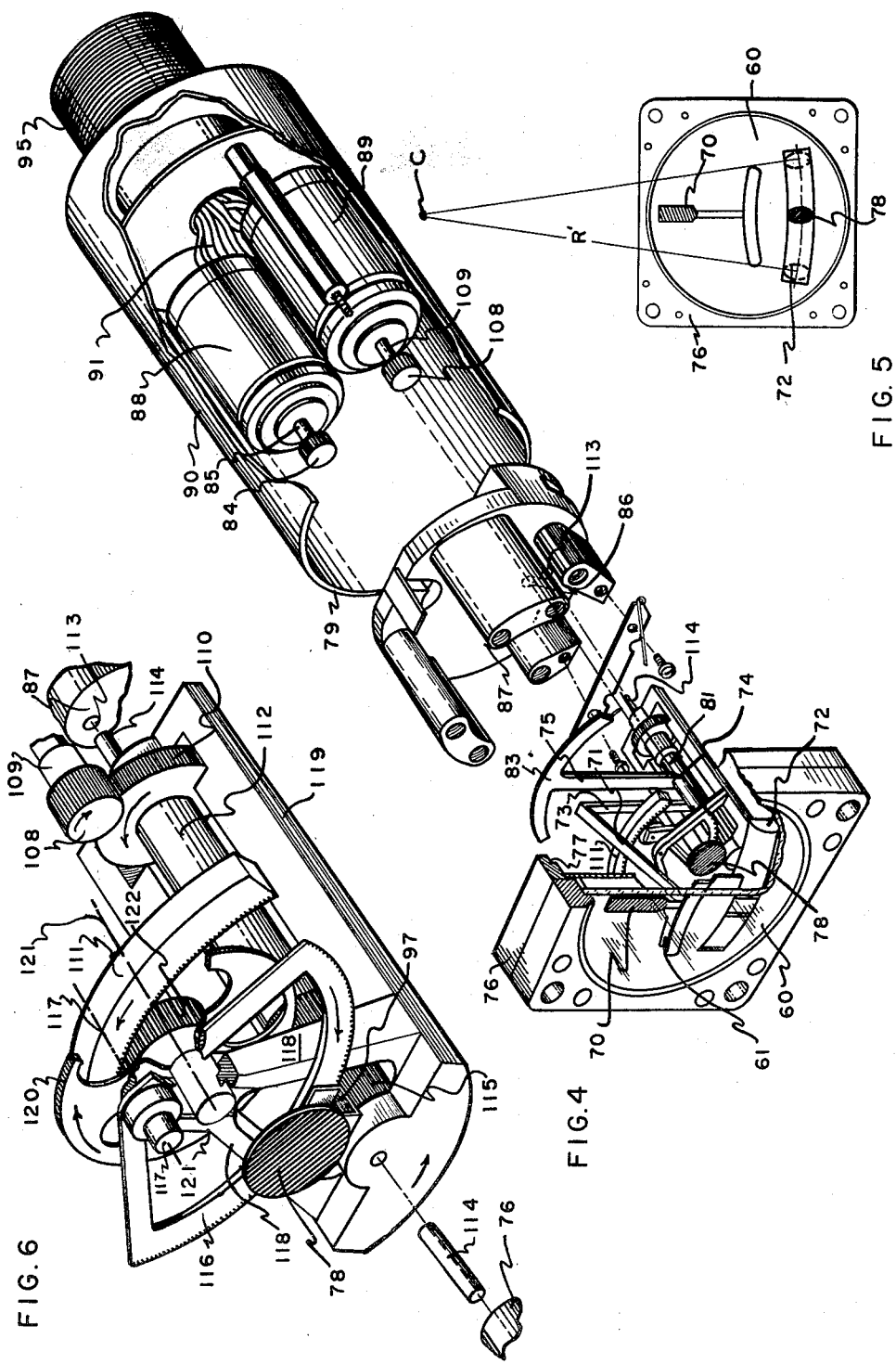

United States Patent Office 2,935,795
Patented May 10, 1960

2,935,795

SIMULATED AIRCRAFT INCLINOMETER INSTRUMENT

Raymond E. Kittredge, Binghamton, N.Y., assignor to General Precision, Inc., a corporation of Delaware Application July 15, 1955, Serial No. 522,210

17 Claims. (Cl. 35—12)

This invention relates to means for producing curvilinear motion of long radius within apparatus of a smaller diameter, and more particularly to apparatus for simulating an aircraft inclinometer or "ball-bank" indicator instrument for grounded aviation trainers.

One of the basic instruments relied upon by aircraft pilots while maneuvering an aircraft in flight is the "needle-ball" turn and bank indicator. In the actual aircraft instrument, an inclinometer comprises an agate ball enclosed within a slightly curved glass vial which is filled with a fluid such as mineral oil. As either wing of the aircraft is dipped, in a banking maneuver, the ball rolls under the force of gravity in the direction of the lowered wing, the rolling motion being damped by the fluid medium. In addition to the inclinometer, the instrument also contains a rate of turn indicator which comprises a normally vertical needle arm adapted to rotate to the right or left from its normal vertical position, the direction and distance of needle swing indicating the direction and rate of turn. When a properly coordinated turn is executed, the direction and angle of bank is such that centrifugal force neutralizes the force of gravity and maintains the ball of the inclinometer in the center of its arcuate tube.

In grounded flight trainers, where the normal forces which actuate the ball inclinometer in a rear aircraft are absent, it becomes necessary to simulate such operation by mechanical means. Heretofore, this has been accomplished by hydraulic or pneumatic pressure applied to a ball member, as disclosed by Patent 2,460,675 to Bourgaize, or by a long radius pendulum corresponding in length to the radius of curvature of the ball vial. Apparatus of the latter type was disclosed by S. I. Hayes in Patent 2,485,286 which is assigned to the assignee of the present application. Means including an arcuate track with a simulated ball member guided thereby, and electrical motor means for driving the simulated ball along the curved track, have also been proposed in United States Patent 2,686,979.

The present invention offers certain advantages over each of the prior art devices. For example, the present invention is less cumbersome and less costly to manufacture and maintain than the hydraulic and pneumatic devices. Further, the present invention obviates the need for a large pendulum structure used in the Hayes device and therefore neither needs a large instrument case which may interfere with the location of other flight instruments in the trainer panel, nor needs external pivoting with the pendulum operating through a slot of a smaller instrument case which permits the entrance of dust or other deleterious foreign matter into the case.

An object of the present invention, therefore, is to overcome the disadvantages in the prior art structures by providing a precision mechanism with electrical drive means which may be completely enclosed and sealed in an instrument case of small diameter and which assures free and realistic motion of a simulated ball member through an arc having a center of curvature remote from the instrument.

A more general object of the invention is to provide improved means for producing curvilinear motion through an arc of long radius within the limited confines of apparatus having a much smaller radius.

Another object of the invention is to provide such means in apparatus adapted to realistically simulate an inclinometer in training apparatus.

A more particular object of the invention is to provide a self-contained electrical instrument realistically simulating the turn and bank indicator instruments employed in modern types of aircraft.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

Fig. 1 illustrates in perspective an exploded view of a complete instrument embodying the invention;

Fig. 2 illustrates a front view of the instrument represented by Fig. 1, showing the long radius from the center of curvature external to the instrument through which the simulated ball member is movable;

Fig. 3 represents a detailed perspective view of the essential portion of the apparatus of Fig. 1 by means of which long radius arcuate motion is produced;

Fig. 4 is an exploded perspective drawing illustrating another embodiment of the invention;

Fig. 5 is a front view of the instrument illustrated by Fig. 4, showing the long radius through which arcuate motion is produced about a center of curvature external to the apparatus; and Fig. 6 is a detailed perspective view, with parts cut away, showing the relation between the principal elements of the operative mechanism illustrated in the embodiment of Fig. 4, by means of which long radius arcuate motion is produced.

Referring first to Fig. 1 of the drawings, the structure of one embodiment of the invention will be described. The simulated turn and bank indicator instrument of Fig. 1 comprises a dial face 10 having an arcuate aperture 11, behind which is mounted a transparent plastic lens 12. A plane transparent glass disc 14, mounted in an annular ring 15 integral with a front mounting block 16, provides a dust-proof window aperture in the face of the instrument. A movable opaque disc 18 behind the plastic lens 12 appears remarkably like an agate ball in a fluid filled glass tube, when viewed through the front window 14. A pair of vertical guide bars 19—19, in the central portion of aperture 11 in dial face 10, mark the mid-portion of the simulated arcuate tube 12, just as in the actual aircraft instrument. A vertical needle-arm 20, pivoted about a horizontal shaft 21 normal to the instrument dial face 10, corresponds to the needle-turn-indicator of the aircraft instrument.

The needle shaft 21 is journaled through a bearing 13 of internal wall 47 and carries affixed to its rear end a gear sector 23 which engages a pinion gear 24. Affixed to the end of pinion 24 is a spur gear 25 which engages another pinion 26 mounted on the rotatable shaft 27 of a reversible electric motor 28. A second reversible motor 29 is adapted to operate the simulated ball-bank indicator as will be described more fully hereinafter in particular reference to Fig. 3 of the drawings. When the instrument of Fig. 1 is assembled, the entire mechanism is enclosed within a sealed cylindrical casing 30. Conductor leads as shown at 31, are brought from motors 28 and 29 through an insulating seal 32, in the rear wall 34 of the casing 30, to an external connector plug 35. The terminals of motor 28 are connected to a simulated rate of turn computer (not shown) whereby the needle 20 is caused to rotate about shaft 21, either to the right or left, depending upon the computed direction of simulated turning motion. The angle of rotation through which motor 28 operates, and the distance which needle 20 swings in either direction is dependent upon the computed rate of turn. A pin 43 may be provided on gear 26 to engage a spring stop whereby the swing of needle 20 in either direction may be limited.

As seen in Fig. 1 the opaque disc 18, which simulates the movable ball member, is affixed to the lower extremity of a pendulum 37 which may be formed of a parallel pair of light weight rigid wire members. Pendulum 37 is rigidly affixed to angularly disposed arms 38—38 of a gear sector 39. A bearing 40, located at the center of curvature of gear sector 39, is rotatably engageable with a pivot pin 41 which is mounted upon radial arm 42 of a longer radius gear sector 44. Arm 42 and gear sector 44 are pivotally supported by a pin 45 engageable with a bearing 46 through an internal wall section 47. Alternatively, if desired, a slightly longer radius gear sector 44 and arm 42 may be employed, having a center of curvature coinciding with axis 21. In this alternative construction the pin 45 and bearing 46 may be eliminated and instead a bearing (not shown) in the end of arm 42 may be freely mounted upon shaft 21. A counter balancing weight 22 is preferably depended from arm 42, below its pivotal axis 45, to offset the weight of arm 42 and gear sector 44. Gear sector 44 engages a pinion gear 48 which is affixed to rotatable shaft 49 of motor 29. A spring stop 53, engageable with a pin on shaft 49, may be provided to limit the angular rotation of pinion 48 to the length of gear sector 44. An annular collar 50, which is integral with pinion gear 48 and shaft 49, serves to guide gear sector 44 in its normal engagement with pinion 48.

When the instrument structure shown exploded in Fig. 1 is assembled, gear sector 39 engages a fixed internal gear sector 51 which is rigidly mounted upon a fixed supporting ring member 52. Ring member 52 also supports the arcuate plastic lens 12, as shown in Fig. 1. The assembled structure is held together by means of bolts or machine screws (not shown) and the forward end 33 of the cylindrical casing 30, Fig. 1, fits snugly over the annular rear portion of the front mounting block 16. A gasket (not shown) may be provided in an annular groove 54 to assure an air-tight, dust-free union between the casing 30 and mounting block 16.

The front view of the assembled structure, as represented by Fig. 2 of the drawings, illustrates the long radius R of the arc through which the ball simulating member 18 is movable behind the arcuate lens 12, to realistically simulate the movement of an agate ball within a fluid filled arcuate vial. As shown in Fig. 2, the center of rotation C of the simulated ball 18 is far outside the hermetically sealed casing of the simulated ball-bank indicator instrument.

Reference is now had to Fig. 3 of the drawings in which the assembled ball-bank simulating mechanism is disclosed. As shaft 49 is rotated in either direction, by motor 29 (Fig. 1), pinion gear 48 affixed thereto and meshing with gear sector 44 imparts rotary motion to arm 42 about fixed axis 45. Pin 41, which is affixed to gear sector 44, also moves through an arc about axis 45. Gear sector 39 which is pivotably mounted upon axis 41 by bearing 40, affixed to and integral with sector arms 38—38, is moved in rolling engagement with fixed internal gear sector 51. As gear sector 39 so rolls, the pendulous arm 37 affixed thereto and integral therewith, swings through an arc about an invisible center (C in Fig. 2), far above the shaft 49 and the fixed internal gear sector 51. The radius of motion described by the disc 18, depending from the lower end of pendulum 37, is determined by the proportions of the various moving parts, including pendulum 37, and the radii of gear sector 39, internal gear 51 and gear sector 44. Thus it will be seen that by means of two gear sectors, 39 and 44, of differing radii contained within a cylindrical enclosure (30, Fig. 1) of relatively small diameter, with the smaller gear sector 39 engaging a fixed internal gear sector 51, the shaft 41 of gear 39 is caused to precess about the axis 45 of gear 44, and pendulum 37 moves disc 18 through an arc having a center of curvature (C, Fig. 2) located a substantial distance outside of the instrument casing enclosure. In this manner, the disc 18 is caused to move through a long radius arc behind plastic lens 12, in realistic simulation of the movement of an agate ball within an arcuate oil filled vial, as in an actual aircraft ball-bank indicator instrument. The movements of the simulated ball member 18 are uniformly smooth and completely free from erratic or jerky motions.

Reference is now had to Fig. 4 of the drawings which illustrates in exploded perspective view an alternative embodiment of the invention wherein the desired long radius arcuate motion is obtained within the confines of an instrument casing of even smaller dimensions than that disclosed by the embodiment of Fig. 1. In Fig. 4 the dial face 60 corresponds generally to the dial 10 of Fig. 1, except that dial 60 is of smaller diameter and contains an arcuate opening 61 above the simulated ball indicator aperture, through which the needle 70 of the turn indicator mechanism operates. A transparent plastic lens 72 serves to simulate an oil filled arcuate vial in the same manner as does the lens 12 of Fig. 1. The front mounting block 76 in this embodiment is provided with an annular groove 77 on the rear face thereof which receives the forward edge 79 of the cylindrical casing enclosure 90 when the instrument is completely assembled. The needle 70 is bent into a horizontal bar portion 71 which extends longitudinally within the instrument and passes over a fixed internal gear section 111. The inner end of bar 71 is bent downwardly to form a vertical bar portion 73, the lower end of which is affixed by bushing 74 to vertical arm 75 of gear sector 83. Needle 70, bushing 74 and gear sector 83 thus form an integral structure which is pivotally mounted on longitudinal shaft 81, journaled in bearing 86 of internal wall member 87. When the structure of Fig. 4 is assembled, gear sector 83 engages pinion gear 84 affixed to the rotatable shaft 85 of reversible electric motor 88. A second reversible motor 89 is adapted to operate the simulated ball-bank indicator as will be described more fully hereinafter with particular reference to Fig. 6 of the drawings. Conductor leads 91 from motors 88 and 89 are brought out to an external connector plug 95 where they may be connected to a simulated turn and bank computer (not shown) whereby the rate of turn needle 70 and the simulated ball member 78 are caused to move either to the right or left depending upon the computed directions of simulated turning and banking motions.

Reference is now made to Fig. 5 of the drawings which illustrates the front view of the structure of Fig. 4 when assembled. In Fig. 5, the radius R' illustrates the long arc through which the ball simulating member 78 is movable behind the arcuate lens 72 to realistically simulate the movement of an agate ball within a fluid filled arcuate vial. As shown in Fig. 5, the center of rotation C of the simulated ball 78 is far outside the hermetically sealed casing of the small diameter simulated ball-bank indicator instrument.

Reference is now had to Fig. 6 of the drawings which discloses in greater detail the assembled ball-bank, simulating mechanism of the instrument shown exploded in Fig. 4. As shaft 109 is rotated in a clockwise direction by operation of reversible motor 89 (Fig. 4) pinion gear 108 drives spur gear 110 counter-clockwise as indicated by the arrow. Shaft 112 affixed to gear 110 and pivoted about axis 114 also rotates counter-clockwise causing pinion gear 115, affixed to the forward end of shaft 112, to rotate gear sector 116 clockwise about shaft 117. Shaft 117 is attached to the upper end of bracket arms 118—118, the lower ends of which are affixed to and integral with a longitudinally extending frame 119 which is also pivoted on the longitudinal axis of shaft 114—114. Shaft 114, at the right end thereof, is fixedly engaged with internal wall member 87 in aperture 113. Spur gear 120 which is also pivotally supported by brackets 118—118, for rotation about axis 121, also engages pinion gear 115 and is simultaneously driven in a clockwise direction as indicated by the arrow. As the radius of gear 120 is less than that of gear sector 116, by a dimension equal to the displacement of axis 121 from the center of shaft 117, gear 120 rotates more rapidly than does gear sector 116. Affixed to gear 120 and also rotatable about axis 121 is pinion gear 122 which meshes with fixed internal gear sector 111. As pinion 122 turns in a clockwise direction about axis 121 (as represented by the arrow), it is rolled around the inside of fixed internal gear sector 111 in a counter-clockwise direction (as represented by the arrow shown on gear 111) causing bracket arms 118—118 to tilt frame 119 in a counter-clockwise direction about the axis of shaft 114—114.

The disc 78 which simulates the movable ball indicator is affixed to the mid-portion of gear sector 116 by means of bracket 97. As gear sector 116 is rotated about its axis 117, the locus of axis 117 rotates about axis 114, thus producing lateral motion of the disc 78 through an arc of very long radius. The exact radius of arcuate motion imparted to disc 78 is determined by the proportions of the ratios of all the gears, 115, 116, 120, 122 and 111. Thus, it will be seen that by means of this combination of gears, including internal gear sector 111, all of which have radii of lesser dimension than the internal diameter of the enclosing container (90, Fig. 4) arcuate motion is imparted to disc 78 through an arc having a center of curvature (C, Fig. 5) located a very substantial distance outside of the instrument casing enclosure.

By the structural combination shown in Fig. 6, or the simplified alternative suggested above, both of which cause shaft 117 of gear sector 116 to rotate about the axis of driving pinion 115, the desired long radius arcuate motion of this embodiment of the invention is achieved within the confines of an even smaller diameter casing than is possible with the embodiment illustrated by Fig. 1 of the drawings. In this manner, the disc 78 is caused to move through a long radius arc behind plastic lens 72 in realistic simulation of the movement of an agate ball within an arcuate fluid filled vial as in an actual aircraft ball-bank instrument. By reason of the gear movement, and the elimination of reliance upon a curved guide track, the movements of the simulated ball member are uniformly smooth and completely free from erratic motions as may be encountered with structures of the prior art.

It may be pointed out that the gear mechanisms employed in the disclosed embodiments of the invention produce an angular motion of the simulated ball member about the remote center C which is not exactly linear with respect to the angular motions of the respective drive shafts of the ball actuating motors. This slight deviation from linear response, which is visually imperceptible, results from the fact that the simulated ball supporting members of the gear mechanism describe a portion of sinusoidal motion. Because of the very short arc of long radius motion which is produced, any such non-linearity can only be detected by the most precise measuring apparatus.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Apparatus for producing motion of long radius within an enclosure of substantially smaller dimensions than the radius to be produced, comprising in combination, a rotatable drive shaft, a first gear affixed to said drive shaft, a second gear rotatably driven by said first gear, a pivot on said second gear displaced from the rotatable axis thereof, a third gear rotatably mounted on said pivot, a fixed internal gear engaged with said third gear, and means on said third gear movable thereby through an arc of longer radius than the dimensions of any of said gears.

2. A simulated inclinometer comprising in combination, a rotatable drive shaft, a pinion gear affixed to said drive shaft, a second gear driven by said pinion gear, a pivot on one side of said second gear, said pivot being parallel to and displaced from the axis of said second gear, a third gear mounted on said pivot, a fixed internal gear engaged with said third gear, and means extending from said third gear for moving a disc simulating a ball-bank indicator.

3. A simulated inclinometer comprising in combination, a rigid casing having a transparent aperture in one end thereof, a simulated ball member situated within said casing and visible through said aperture, a rotatable drive shaft within said casing, a pinion gear affixed to said drive shaft, a second shaft within said casing, a second gear within said casing and coaxially mounted upon said second shaft and in engagement with said pinion gear, means in engagement with said pinion gear for causing said second shaft to pivot about an arc within said casing, said second gear being constrained to rotate exclusively in an angular sense opposite to the angular sense in which said second shaft pivots, and means extending from said second shaft for moving said ball member through an arc having a center of curvature outside of said casing.

4. A simulated inclinometer instrument comprising in combination, a rigid casing having a transparent aperture in one end thereof, a movable disc within said casing and visible through said aperture, a pinion gear affixed to a rotatable shaft within said casing, a second gear of greater radius than said pinion and engaged therewith, a pivot on said second gear displaced from the rotational axis thereof, a third gear of greater radius than said pinion rotatably mounted on said pivot, an internal gear affixed to said rigid casing and engaged with said third gear, and means extending from said third gear to said disc for imparting arcuate motion to said disc within said casing through an arc having a center of curvature outside of said casing.

5. Apparatus for producing motion along a line of any desired radius comprising in combination, a reversibly rotatable drive shaft, a pinion gear affixed to said drive shaft and rotatable thereby, a first gear sector of substantially greater radius than said pinion pivotally mounted upon an axis extending parallel to the axis of said drive shaft, means guiding said first gear sector in meshing engagement with said pinion gear, a pivot on said first gear sector in proximity to the pitch circle thereof, the axis of said pivot extending parallel to the axes of said pinion and first sector gears, a second gear sector rotatably mounted on said pivot, a fixed internal gear sector in meshing engagement with said second gear sector, and means mounted on said second gear sector and movable thereby through a radius greater than the radii of any of said gears.

6. A simulated inclinometer instrument comprising in combination, a rigid casing having a transparent aperture in one end thereof, a movable disc within said casing and visible through said aperture, a pinion gear affixed to a rotatable drive shaft within said casing, a gear sector of substantially greater pitch diameter than said pinion pivotally mounted within said casing and in engagement with said pinion, a pivot affixed to said gear sector in proximity to the pitch circle thereof, a second gear sector rotatably supported on said pivot, an internal gear ridgdly affixed to said casing and in engagement with said second gear sector, and a pendulum affixed to said second gear sector and extending radially from the pivotal axis thereof to support said disc, whereby upon rotation of said drive shaft said disc is caused to move through an arc of long radius having a center of curvature substantially removed from said casing.

7. A simulated inclinometer indicator instrument comprising in combination, an enclosure having a transparent aperture in one end thereof, a simulated ball member movably mounted within said enclosure and visible through said aperture, a drive shaft rotatably mounted within said enclosure, reversible means for imparting rotation to said drive shaft, a pinion gear affixed to said drive shaft, a gear sector of substantially greater pitch radius than said pinion pivotally mounted within said enclosure in engagement with said pinion, a pivot on said gear sector at a position substantially removed from the rotatable axis of said sector, a second gear sector rotatably mounted on said pivot, a fixed internal gear mounted within said enclosure and in engagement with said second gear sector, and a radial arm on said second gear sector supporting said simulated ball member, whereby upon rotation of said drive shaft in either direction said simulated ball member is moved through an arc of long radius having a center of curvature outside of said enclosure.

8. Apparatus for producing motion of long radius comprising in combination, a reversibly rotatable drive shaft, a rigid frame pivotally mounted on the axis of said drive shaft, a rotational bearing on said frame, said bearing having an axis parallel to the axis of said drive shaft, a pinion gear mounted on said drive shaft, a spur gear mounted on the rotational bearing of said frame and engaged with said pinion gear, a second pinion gear mounted on the axis of said spur gear and driven therewith, a fixed internal gear sector meshed with said second pinion whereby upon rotation of said second pinion in either direction said frame is caused to rotate in the opposite direction about the axis of said drive shaft, and means mounted on said frame rotationally responsive about its axis to said first pinion gear and revolvably responsive about said drive shaft axis to the rotation of said frame thereabout.

9. Apparatus for producing curvilinear motion of long radius comprising in combination, a reversibly rotatable drive shaft, a pinion gear on said drive shaft, a frame pivoted about the axis of said drive shaft, a spur gear rotatably mounted on said frame and engaged with said pinion, a second pinion coaxial with said spur gear and rotatable therewith, a fixed internal gear sector engaged with said second pinion whereby upon rotation of said drive shaft in either direction said spur gear and second pinion are caused to pivot about the axis of said drive shaft in a direction opposite to the rotation thereof, and means mounted on that end of said frame most remote transversely from said drive shaft axis, whereby at least a portion of said means is movable along an arc having a radius greater than the distance from said drive shaft axis to said axis of said means.

10. A simulated inclinometer indicating instrument comprising in combination, a reversibly rotatable drive shaft, a first pinion gear on said drive shaft, a rigid frame pivotally mounted on the axis of said drive shaft, a pair of rotational bearings on said frame having axes parallel to the axis of said drive shaft, a spur gear rotatably mounted on one of said bearings and engaged with said first pinion, a second pinion gear mounted on the axis of said spur gear and rotatable thereby, a fixed internal gear sector in meshing engagement with said second pinion, a spur gear sector rotatably mounted on the other of said pair of bearings and engaged with said first pinion gear, and a simulated ball member mounted on said spur gear sector and movable thereby.

11. Apparatus for producing curvilinear motion of long radius comprising in combination, a reversibly rotatable drive shaft, a rigid frame pivotally mounted on the axis of said drive shaft, first and second rotational bearings on said frame having axes parallel to the axis of said drive shaft, said bearings located on a line extending radially from the pivotal axis of said frame, a pinion gear mounted on said drive shaft, a spur gear mounted on said first rotational bearing and engaged with said pinion gear, a second pinion gear mounted on the axis of said spur gear and driven therewith, a fixed interal gear sector meshed with said second pinion whereby upon rotation of said second pinion in either direction said frame is caused to rotate in the opposite direction about its pivotal axis, and a spur gear sector rotatably mounted on said second bearing and engaged with said first pinion whereby upon rotation of said drive shaft in either direction a point on said spur gear sector is moved through an arc of long radius.

12. A simulated ball-bank indicating instrument comprising in combination, a rigid casing having a transparent aperture in one end thereof, a movable disc within said casing and visible through said aperture, a rotatable shaft supported within said casing, a first pinion gear affixed to said rotatable drive shaft within said casing, a spur gear of substantially greater pitch diameter than said pinion mounted upon a second shaft and engaged with said first pinion gear, a second pinion gear mounted on said second shaft and affixed to said spur gear, an internal gear coaxial with said drive shaft, said internal gear affixed to said casing and engaged with said second pinion whereby upon rotation of said drive shaft said spur gear and second pinion are caused to pivot about the axis of said drive shaft, a movable frame pivotally mounted about the axis of said drive shaft and supporting said second shaft, a pivot on said frame located on a line passing through the rotational axes of said first and second pinions, a gear sector of substanially greater pitch diameter than said spur gear rotatably mounted on said pivot and engaged with said first pinion, and means mounting said disc on said gear sector.

13. Apparatus for moving an object within a casing along an arcuate path of greater radius than the height of the casing, comprising a casing, a rotatable member within the casing, a pivot which is displaced from but parallel to the axis of rotation of said member mounted on said rotatable member, a sector gear means mounted on said pivot within the casing, said object being mounted on said sector gear means, means constraining said rotatable member and said sector gear means to rotate exclusively in opposite directions at all times, whereby said object describes an arcuate path within the casing, and mensuration means for displaying said arcuate path described by said object within said casing.

14. Apparatus for producing motion of long radius within an enclosure of substantially smaller internal dimension that the radius to be produced, comprising in combination, a rotatable drive shaft having an axis, a first gear affixed to said drive shaft, a second gear rotatably driven by said first gear, a pivot means arcuately drivable about the axis of said drive shaft and fixedly displaced from and parallel to the axis of said second gear, a third gear drivable by said drive shaft and rotatably mounted on said pivot means, a fixed internal gear engaged with said third gear, and visual indicating means mounted on said second gear and driven through said second and third gears and movable thereby.

15. A simulated ball-bank indicator comprising in combination a rotatable drive shaft, a pinion gear affixed to said drive shaft, a second gear driven by said pinion, an arcuately drivable pivot means fixedly displaced from and parallel to the axis of said second gear, a third gear mounted on said pivot means and driven by said pinion gear, a first internal gear engaged with said third gear, a disc simulating said ball-bank indicator mounted on said second gear, a rigid frame member coupling the shafts of said second and third gears, and visual indicating means for displaying the motion of said disc.

16. A simulated inclinometer instrument comprising in combination a rigid casing and a transparent aperture in one end thereof, a movable disc within said casing and visible through said aperture, a pinion gear affixed to the rotatable shaft within said casing, a second gear of greater radius than said pinion within said casing and engaged therewith, a circularly drivable pivot means fixedly displaced from and parallel with the axis of said second gear, a third gear of greater radius than said pinion rotatably mounted on said pivot means, an internal gear affixed to said rigid casing and engaged with said third gear, and said disc being mounted on said second gear and driven through said second and third gears for imparting arcuate motion to said disc within said casing.

17. Apparatus for moving an object within a casing over an arcuate path of radius greater than the largest dimension of said casing in the plane containing said arcuate path, comprising: a member adapted to support said object; means for rotating said member about a shaft supporting it; means for revolving said shaft in a direction perpendicular to said shaft about a point external to said member; and means for constraining said member and said shaft to rotate and revolve, respectively, exclusively in opposite angular senses and to describe an arc formed by said object due solely to said rotation and an arc formed by said shaft due solely to said revolution which are concave in opposite directions, and indicating means for displaying the motion of said object within said casing.

References Cited in the file of this patent

UNITED STATES PATENTS

| | | |
|---|---|---|
| 1,928,310 | De Jur | Sept. 26, 1933 |
| 2,178,306 | Lauck | Oct. 31, 1939 |
| 2,284,179 | Thelin | May 26, 1942 |
| 2,381,872 | Baker | Aug. 14, 1945 |
| 2,460,675 | Bourgaize | Feb. 1, 1949 |
| 2,472,888 | Cunningham | June 14, 1949 |
| 2,485,286 | Hayes | Oct. 18, 1949 |
| 2,578,177 | Dehmel | Dec. 11, 1951 |
| 2,655,046 | Seifried | Oct. 13, 1953 |
| 2,686,979 | Benson et al. | Aug. 24, 1954 |